(12) United States Patent
Mouli

(10) Patent No.: US 7,418,161 B2
(45) Date of Patent: Aug. 26, 2008

(54) PHOTONIC CRYSTAL-BASED OPTICAL ELEMENTS FOR INTEGRATED CIRCUITS AND METHODS THEREFOR

(75) Inventor: Chandra Mouli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 30 days.

(21) Appl. No.: 10/872,499

(22) Filed: Jun. 22, 2004

(65) Prior Publication Data

US 2005/0281524 A1 Dec. 22, 2005

(51) Int. Cl.
*G02F 1/01* (2006.01)
*G02B 6/10* (2006.01)

(52) U.S. Cl. .............................. 385/1; 385/31; 385/39; 385/129; 385/130; 385/131

(58) Field of Classification Search ..................... 385/1
See application file for complete search history.

(56) References Cited

U.S. PATENT DOCUMENTS

| | | | | |
|---|---|---|---|---|
| 5,999,308 | A * | 12/1999 | Nelson et al. | 359/321 |
| 6,093,246 | A * | 7/2000 | Lin et al. | 117/92 |
| 6,674,949 | B2 * | 1/2004 | Allan et al. | 385/129 |
| 6,728,457 | B2 * | 4/2004 | Sigalas et al. | 385/125 |
| 6,768,256 | B1 * | 7/2004 | Fleming et al. | 313/501 |
| 6,856,737 | B1 * | 2/2005 | Parker et al. | 385/122 |
| 2002/0021878 | A1 * | 2/2002 | Allan et al. | 385/129 |
| 2002/0146196 | A1 * | 10/2002 | Shirane et al. | 385/16 |
| 2002/0159126 | A1 * | 10/2002 | Sigalas et al. | 359/245 |
| 2004/0008945 | A1 * | 1/2004 | Sigalas | 385/45 |
| 2004/0055528 | A1 * | 3/2004 | Miyazaki | 117/84 |
| 2004/0121157 | A1 * | 6/2004 | Barnes | 428/407 |
| 2005/0128592 | A1 * | 6/2005 | Nishii et al. | 359/573 |

OTHER PUBLICATIONS

Shen ("Solitons Made Simple", The American Association for the Advancement of Science, vol. 276 No. 5318, Jun. 6, 1997, p. 1520).*
Parimi et al ("Imaging by a Flat Lens due to Negative Refraction," Nature Publishing Group, vol. 426, Nov. 2003, pp. 1-4 and 404).*
R. Biswas et al.—"Photonic band gaps of porous solids," The American Physical Society, Physical Review B, vol. 61, No. 7, Articles, Feb. 15, 2000, pp. 4549-4553.
M. J. Cryan et al.—"Design and Simulation of a Photonic Crystal Waveguide Filter Using the FDTD Method," IEEE, 2002 pp. 669-670.

(Continued)

*Primary Examiner*—Frank G Font
*Assistant Examiner*—Ryan Lepisto
(74) *Attorney, Agent, or Firm*—Dickstein Shapiro LLP

(57) ABSTRACT

Exemplary embodiments of the invention provide photonic crystal-based optical elements for integrated circuits. A photonic crystal optical device comprises a substrate and a plurality of pillars forming a photonic crystal structure over the substrate. The pillars are spaced apart from each other. Each pillar has a height and a horizontal cross-sectional shape. A material with a different dielectric constant than the pillars is provided within the spacing between the pillars. According to exemplary embodiments of the invention, the photonic crystal-based optical element can be an optical interconnect, a lens, or a filter. The photonic crystal-based optical element of the invention can be used to transmit solitons.

58 Claims, 10 Drawing Sheets

OTHER PUBLICATIONS

H. Han et al.—"Terahertz pulse propagation in a plastic photonic crystal fiber," American Institute of Physics, Applied Physics Letters, vol. 80, No. 15, Apr. 15, 2002, pp. 2634-2636.

Pantanjali V. Parimi et al.—"Imaging by a Flat Lens due to Negative Refraction," Nature Publishing Group, vol. 426, Nov. 2003, pp. 1-4 and p. 404.

J.B. Pendry—"Negative Refraction Makes a Perfect Lens," The American Physical Society, Physical Review Letters, vol. 85, No. 18, Oct. 30, 2000, pp. 3966-3969.

E. Rave et al.—"Infrared photonic crystal fiber," American Institute of Physics, Applied Physics Letters, vol. 83, No. 10, Sep. 8, 2003, pp. 1912-1914.

K. Matsuda et al.—"Tunable single-photon source using Korteweg-de Vries solitons," American Institute of Physics, Applied Physics Letters, vol. 81, No. 15, Oct. 7, 2002, pp. 2698-2700.

A.C. Stevenson et al.—"Detection of acoustic solitary waves in non-linear lithium niobate crystals," American Institute of Physics, Applied Physics Letters, vol. 82, No. 16, Apr. 21, 2003, pp. 2733-2735.

* cited by examiner

PHOTONIC CRYSTAL-BASED OPTICAL ELEMENTS FOR INTEGRATED CIRCUITS AND METHODS THEREFOR

FIELD OF THE INVENTION

The present invention relates generally to the field of semiconductor devices and more particularly to photonic crystal-based optical devices for use in integrated circuits.

BACKGROUND OF THE INVENTION

Metal lines over insulators and ground planes, metal lines buried in close proximity to dielectric insulators and interconnection lines on interposers and printed circuit boards are commonly used in conventional interconnects. Integrated circuit speed performance is determined not by transistor switching speeds, but by interconnect delays. As the size of metal lines used in conventional interconnects is scaled down and their structure is brought closer in proximity, their parasitic resistance and capacitance increases. For example, it is well known that even in a copper-based low resistance metal process, it is critical to reduce interconnect capacitance to obtain speed benefits over an aluminum-based metal process.

Optical interconnects on the other hand, do not have parasitic issues and, therefore, are very appealing, particularly as integrated circuit size gets smaller. In an optical interconnect, speed is determined largely by the velocity of light in the interconnect medium and other associated complexities, such as modulation and de-modulation of signals from electrical to optical, and optical to electrical.

Photonic crystals have recently been of interest in optical technologies, due, in part, to their photonic band gaps. The term "photonic crystal" refers to a material and/or lattice of structures (e.g., an arrangement of pillars) with a periodic alteration in the index of refraction. A photonic crystal interacts with electromagnetic waves analogously to how a semiconductor crystal interacts with charge particles or their wave forms, i.e., photonic crystal structures are optical analogs of semiconductor crystal structures. The fundamental aspect of both photonic and semiconductor crystals is their periodicity. In a semiconductor, the periodic crystal structure of atoms in a lattice is one of the primary reasons for its observed properties. For example, the periodicity of the structure allows quantization of energy (E) levels and wave vector momentum (k) levels (band structure, E-k relationships). In a similar manner, photonic crystals have structures that allow the tailoring of unique properties for electromagnetic wave propagation. Similar to band gap energy in semiconductors, where carrier energies are forbidden, photonic crystals can provide a photonic band gap for electromagnetic waves, where the presence of particular wavelengths is forbidden. See Biswas, R. et al., *Physical Review B*, vol. 61, no. 7, pp. 4549-4553 (1999), the entirety of which is incorporated herein by reference.

Unlike semiconductors, photonic crystals are not limited to naturally occurring materials and can be synthesized easily. Therefore, photonic crystals can be made in a wide range of structures to accommodate the wide range of frequencies and wavelengths of electromagnetic radiation. Electromagnetic waves satisfy the simple relationship to the velocity of light:

$$c = n\lambda$$

where c=velocity of light in the medium of interest, n=frequency and $\lambda$=wavelength. Radio waves are in the 1 millimeter (mm) range of wavelengths whereas extreme ultraviolet rays are in the 1 nanometer (nm) range. While band structure engineering in semiconductors is very complex, photonic band structure engineering in photonic crystals it is relatively simple. Photonic crystals can be engineered to have a photonic band structure that blocks predetermined wavelengths of light while allowing other wavelengths to pass through.

Photonic crystals can also demonstrate negative refraction. A material that shows a negative refractive index can refract electromagnetic waves with a flat surface. In contrast, conventional lenses have a positive refractive index, and therefore, have a curved surface. See Parimi, Patanjali V. et al., *Nature*, vol. 426, p. 404 (2003), the entirety of which is incorporated herein by reference, for a discussion of experimental results demonstrating negative refraction at microwave frequencies. See also Pendry, J. B., *Physics Review Letters*, vol. 85, no. 18, pp. 3966-3969 (2000), which is incorporated herein by reference.

It is desirable to have an interconnect for an integrated circuit for high speed performance even at smaller integrated circuit sizes. More particularly, it is desirable to have photonic crystal-based elements, including an optical interconnect and filters and lenses for optical interconnects for an integrated circuit.

BRIEF SUMMARY OF THE INVENTION

Exemplary embodiments of the invention provide photonic crystal-based optical elements for integrated circuits. A photonic crystal optical device comprises a substrate and a plurality of pillars forming a photonic crystal structure over the substrate. The pillars are spaced apart from each other. Each pillar has a height and a horizontal cross-sectional shape. A material with a different dielectric constant than the pillars is provided within the spacing between the pillars. According to exemplary embodiments of the invention, the photonic crystal-based optical element can be an optical interconnect, a lens, or a filter. The photonic crystal-based optical element of the invention can be used to transmit solitons.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Figure 1A:
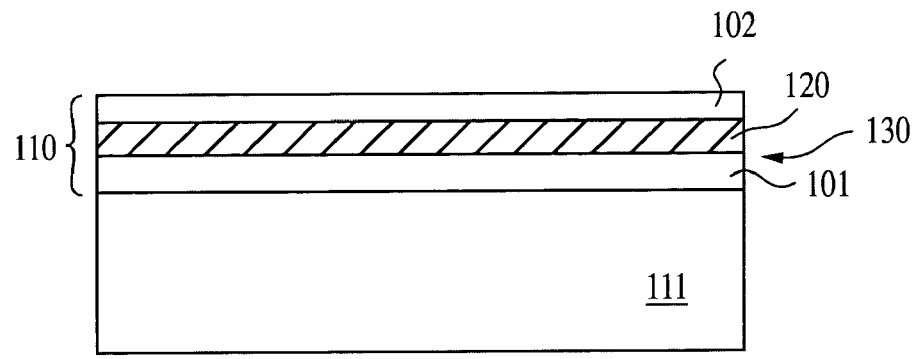
FIG. 1A is a cross-sectional view of a portion of an optical element according to an exemplary embodiment of the invention.

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The terms "wafer" and "substrate" are to be understood as including silicon, silicon-on-insulator (SOI), silicon-on-nothing (SON), and silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions or junctions in the base semiconductor structure or foundation, as well as insulating substrates, such as glass or quartz. In addition, the semiconductor need not be silicon-based, but could be based on silicon-germanium, germanium, or gallium-arsenide.

The term "photonic crystal" refers to a material and/or lattice of structures (e.g., an arrangement of pillars) with a periodic alteration in the index of refraction. "Photonic crystal structure" refers to the lattice structure (e.g., the way in which pillars are arranged).

Embodiments of the invention provide photonic crystal-based optical elements for use in integrated circuits and methods for forming the same. In one exemplary embodiment depicted in FIGS. 1A and 1B, the photonic crystal-based optical element is an interconnect 110 on a semiconductor substrate 111. In the illustrated embodiment, the substrate is a silicon substrate. As noted above, however, the substrate can be other materials if desired.

The interconnect 110 includes a first cladding layer 101 and a second cladding layer 102. The first and second cladding layers 101, 102 together surround a photonic crystal layer 120 having a photonic crystal structure. The photonic crystal structure of layer 120 is configured to propagate one or more wavelengths of electromagnetic radiation. Further, the photonic crystal structure of layer 120 can be configured to have a photonic band-gap to prevent the transmission of one or more wavelengths of electromagnetic radiation.

Figure 1B:
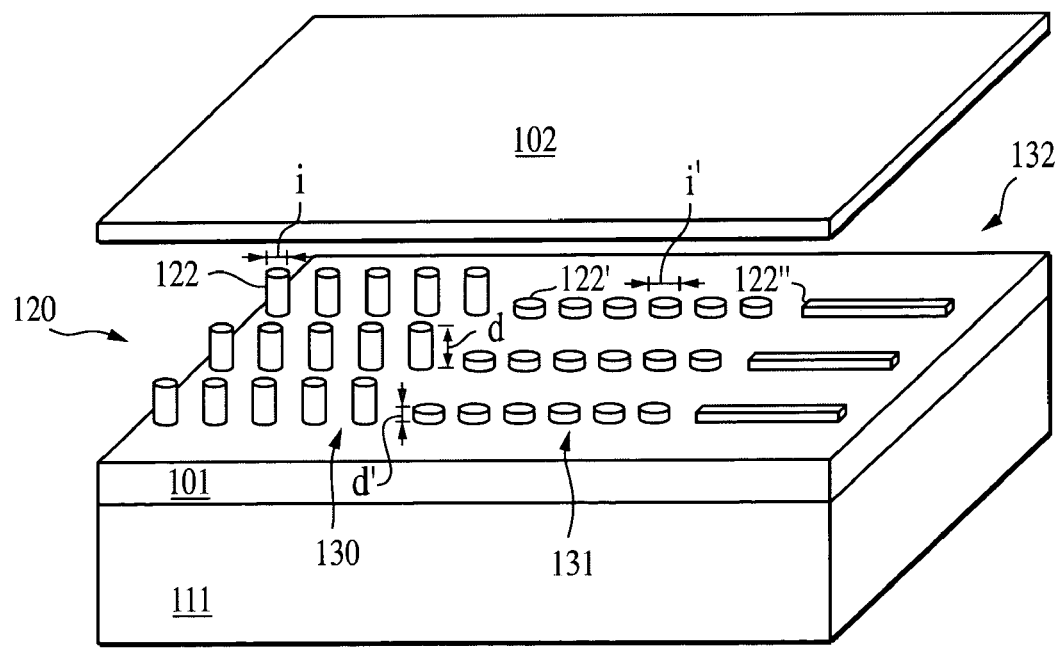
FIG. 1B is a three dimensional view of a portion of the optical element of FIG. 1A.

FIG. 1B is a three dimensional view of a portion of the optical element of FIG. 1A along a plane perpendicular to the view of FIG. 1A. Accordingly, FIG. 1A shows a region 130 of the layer 120, whereas FIG. 1B shows regions 130, 131, and 132. As shown in FIG. 1B, the photonic crystal layer 120 includes pillars 122, 122', 122" of a material suitable for forming a photonic crystal. The pillars 122, 122'; 122" form photonic crystal structures in the regions 130, 131, 132 of the layer 120. Between the pillars 122, 122', 122" is a layer 123 (FIG. 3C) of dielectric material.

In the illustrated exemplary embodiment, the photonic crystal structure of the layer 120 is different between different regions 130, 131, 132. By creating different regions 130, 131, 132 having differing photonic crystal structures, the layer 120 can be engineered to have an optical band-gap preventing the transmission of predetermined wavelengths of electromagnetic radiation. It should be understood, however, that the layer 120 could instead have a uniform photonic crystal structure.

Specifically, to achieve different photonic crystal structures between regions 130, 131, 132, the shapes of the pillars 122, 122', 122" are different between the regions 130, 131, 132. The pillars 122, 122' in regions 130, 131, each have a circular cross-sectional shape. However, the pillars 122' in region 131 have a different thickness d' and diameter i', than the thickness d and diameter i of the pillars 122 in region 130. The pillars 122" in the region 132 have a rectangular cross-sectional shape. In this manner, the photonic crystal structures of the regions 130, 131, 132 are different. It should be understood, however, that achieving differences in the photonic crystal structures of regions 130, 131, 132 can be accomplished in other ways, as described below in connection with FIGS. 3B-4F. It should also be understood that the layer 120 can have more or fewer regions having different photonic crystal structures.

Figure 2:
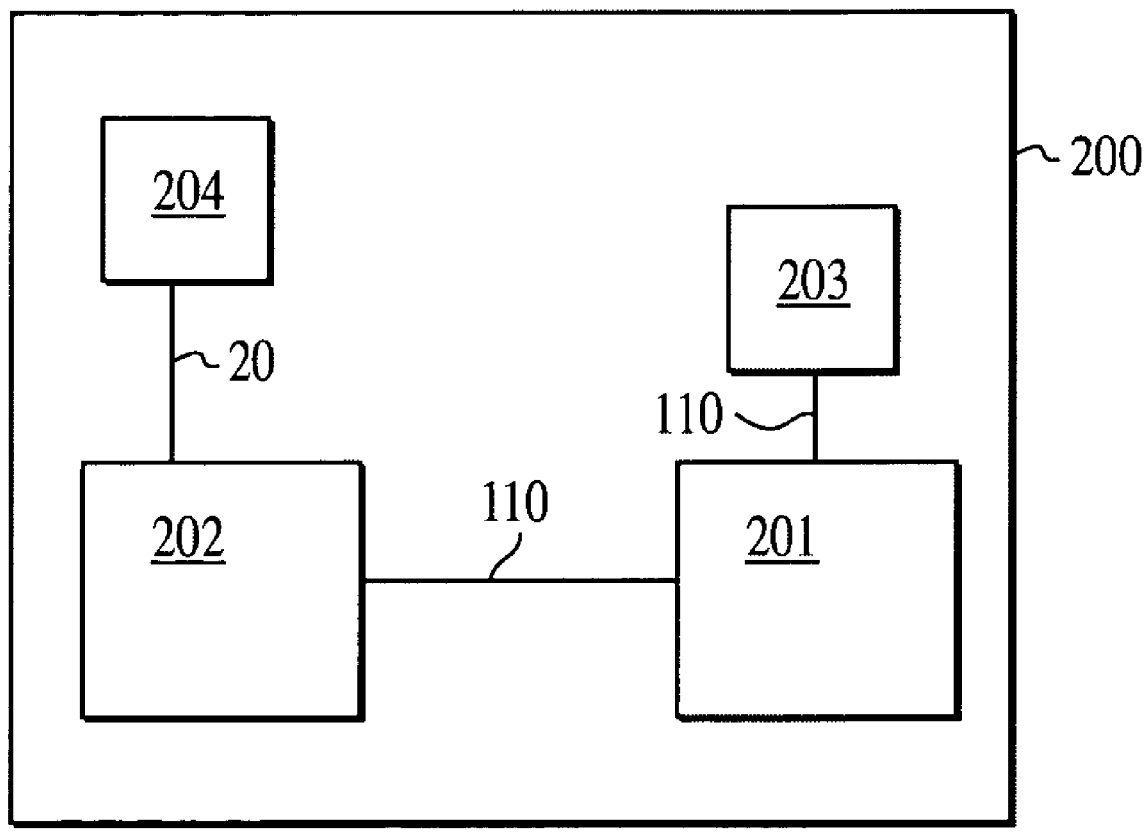
FIG. 2 is a block diagram of an integrated circuit including the optical element of FIG. 1.

As shown in FIG. 2, the interconnect 110 can be formed as an on-chip interconnect between two devices or circuits 201, 202, 203 on a chip 200. The interconnect 110 can replace conventional metal lines and the chip 200 can include any number of interconnects 110. Preferably, as shown in FIG. 2, the chip 200 includes both interconnects 110 and metal lines 20. The interconnects 110 are used in speed sensitive portions of the chip 200 (i.e., between devices or circuits 201/202 and 201/203) and metal lines 20 are used elsewhere on the chip 200 (i.e., between devices/circuits 202/204).

According to an embodiment the invention, the photonic crystal optical interconnect 110 is suitable for transmitting solitons as signals. Solitons are "solitary waves" that propagate in a medium with very little or no distortion to their shape or form. They occur under special circumstances in nonlinear, dispersive media and there is a strong mathematical and physical foundation for their existence. Mathematically, solitons are a direct result based on the integrability of a class of nonlinear differential equations (e.g., the Korteweg-de Vries (KdV) equation). There have also been several experimental demonstrations of the existence of solitons, for example, acoustic solitons in nonlinear lithium niobate. There are also reports of single-phonon sources using solitons. See Matsuda, Ken-ichi, "Tunable Single-Photon Source using Korteweg-de Vries Soliton," *Applied Physics Letters*, Vol. 81, No. 15, pp 2698-2700 (2002).

Solitons are very attractive for optical communications due to their unique and desirable propagation properties. Spatial solitons are a special class of solitons that are a result of a balance between optical diffraction and self-focusing in a medium. Typically, solitons occur in a medium whose refractive index ($\eta$) depends on intensity of light, I.

While solitons can be mathematically complex, they are easily predicted in a medium with a non-local response and a correlation length much greater than the light beam diameter. Photonic crystals provide a means to engineer a photonic crystal structure of the interconnect 110 whose optical response correlation length is much larger than the beam diameter, as is described in more detail below in connection with FIGS. 3A-4F.

Figure 3A:
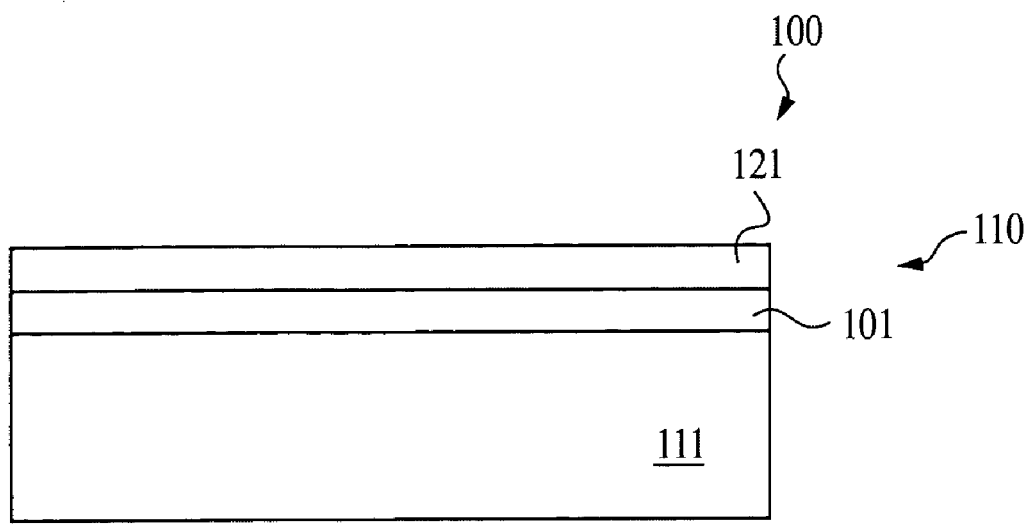
FIG. 3A illustrates the formation of the optical element of FIG. 1 at an initial stage of processing.
Figure 3B:
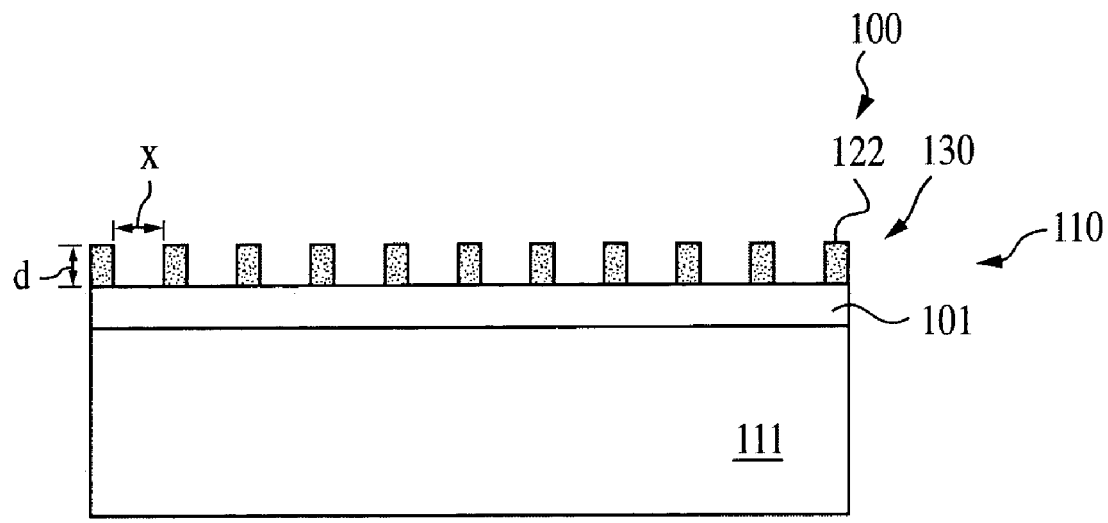
FIGS. 3B-3C illustrate the formation of the optical element of FIG. 1 at an intermediate stages of processing.
Figure 3C:
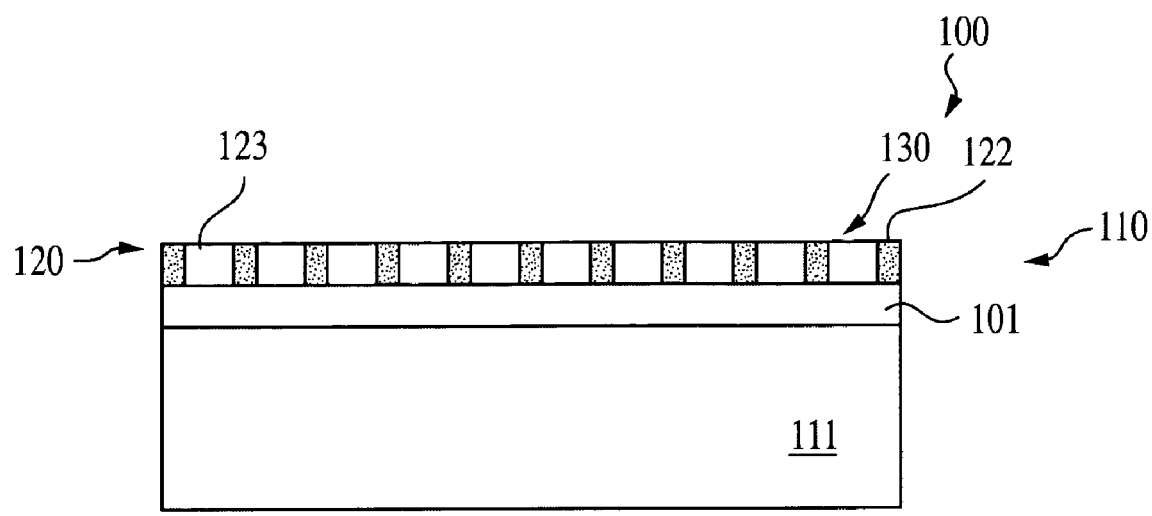

FIGS. 3A-3C depict process steps for forming the interconnect 110 according to an exemplary embodiment of the invention. For simplicity, the formation of the interconnect 110 is described in connection with the formation of the region 130 of the interconnect 110. The regions 131, 132 can be formed in a similar manner to the region 130, except that regions 131, 132 are formed having different photonic crystal structures, as described in more detail below. The regions 130, 131, 132 can be formed concurrently or separately. No particular order is required for any of the actions described herein, except for those logically requiring the results of prior actions. Accordingly, while the actions below are described as being performed in a general order, the order is exemplary only and can be altered.

Referring to FIG. 3A, the lower cladding layer 101 is formed on the substrate 111. In the illustrated embodiment the lower cladding layer 101 is a dielectric layer of e.g., borophosphosilicate glass (BPSG), or other dielectric material.

As depicted in FIG. 3A, a layer 121 of material suitable for forming a photonic crystal is formed over the lower cladding layer 101. Examples of materials suitable for forming layer 121 include metal oxides, such as aluminum oxide ($Al_2O_3$), zirconium oxide ($ZrO_2$), hafnium oxide ($HfO_2$); and hafnium-based silicates; silver halides, such as $AgCl_xBr_{1-x}$, polymer materials based on high density polyethylene; among others. It should be noted that certain materials can yield a photonic crystal that absorbs a portion of the photons. If the absorption is excessive, quantum efficiency can be detrimentally affected. Preferably, layer 121 is a layer of $Al_2O_3$ since it offers less absorption and is similar to silicon oxide ($SiO_2$) in its barrier properties. The thickness of layer 121 can be chosen as needed or desired. Preferably, layer 121 is formed having a thickness within the range of approximately 100 Å to approximately 5000 Å.

Using a mask level, the $Al_2O_3$ layer 121 is patterned and etched to create a photonic crystal structure of pillars 122, as depicted in FIGS. 3B and 3C. Referring to FIG. 3B, the ratio x/d of spacing x between the pillars 122 to the thickness d of layer 121 (or height of the pillars 122) can be varied to achieve desired characteristics of the photonic crystal. Illustratively, x/d is within the range of approximately 1 to approximately 10. Alternatively, spacer-defined lithography can also be used, particularly if patterning the pillars 122 to achieve a desired ratio x/d is a challenge with existing lithography techniques.

A layer 123 is deposited between the pillars 122 and planarized using a CMP step, as illustrated in FIG. 3C. The layer 123 can be formed by known techniques of any suitable material having a low dielectric constant, for example, spun on glass (SOG) or $SiO_2$, among others. For simplicity, the pillars 122 and layer 123 are depicted collectively as layer 120.

Figure 4A:
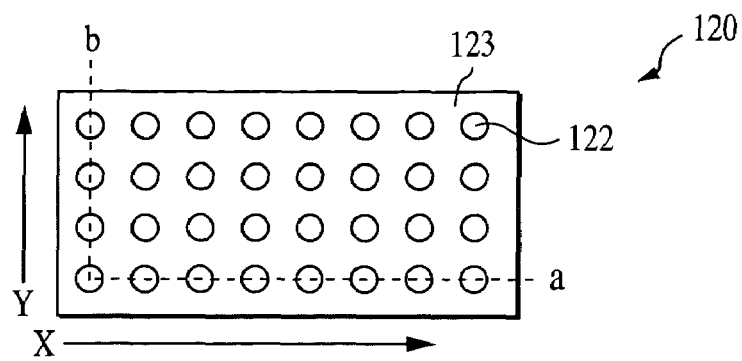
FIGS. 4A-4G are top plan view of a portion of the optical element of FIG. 1 according to exemplary embodiments of the invention.
Figure 4B:
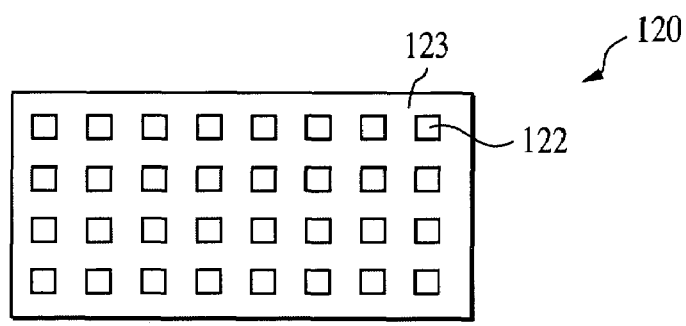
Figure 4C:
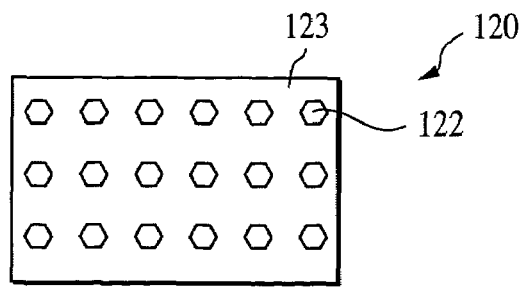
Figure 4D:
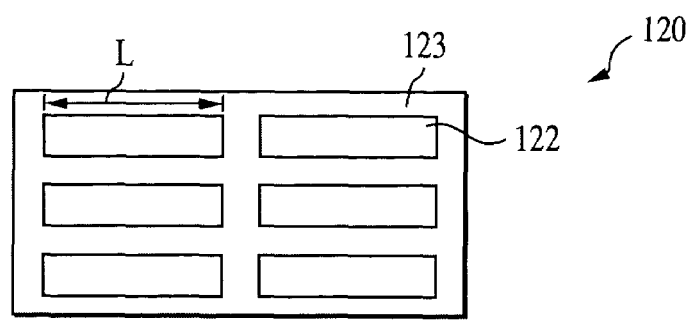

The pillars 122 are formed having a circular cross-sectional shape as shown in FIGS. 1B and 4A. The pillars 122, however, can instead be formed having any desired horizontal cross-sectional shape. FIGS. 4A-4D depict pillar 122 shapes according to exemplary embodiments of the invention. FIG. 4A is a top plan view of layer 120 with pillars 122 having a circular cross-sectional shape (i.e., the pillars 122 are cylinders). FIGS. 4B and 4D depict layer 120 including pillars 122 having a rectangular cross-sectional shape. As shown in FIGS. 4B and 4D, pillars with a same cross-sectional shape can have different dimensions, such as length L. FIG. 4C depicts layer 120 including pillars 122 having pentagonal cross-sectional shapes.

Figure 4E:
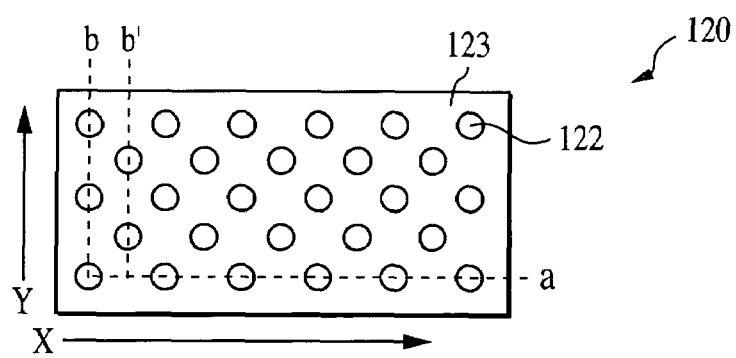

Also, the pillars 122 can be arranged in a variety of orientations. In the exemplary embodiment of FIGS. 1A and 1B, and as shown in FIG. 4A, the pillars 122 are arranged in columns B in the Y direction and rows A in the X direction, such that a pillar 122 from each consecutive row A forms a column B in the Y direction. Alternatively, as shown in FIG. 4E, the pillars 122 can be arranged in rows along line A in the X direction with each row along line A being offset from an adjacent row A, such that pillars 122 from every other row A form a column B and B', respectively, in the Y direction.

Figure 4F:
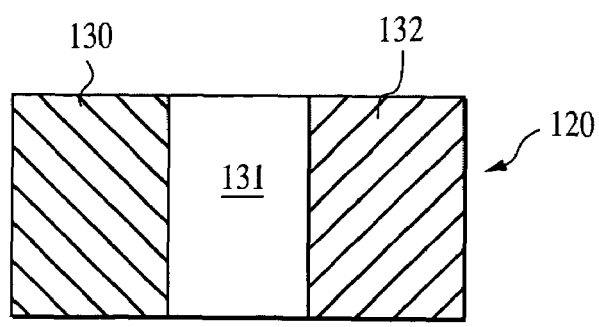

As described above in connection with FIG. 1B and as shown in FIG. 4F, the layer 120 includes regions 130, 131, 132 each having a different photonic crystal structure. That is, one or more design variables are different between the regions 130, 131, 132. Although three regions of differing photonic crystal structures are shown in FIGS. 1B and 4F, the layer 120 can include any number of regions in any desired arrangement, each having a different photonic crystal structure from an adjacent region. By creating different regions 130, 131, 132 having differing photonic crystal structures, the layer 120 can be engineered to have an optical band-gap preventing the transmission of predetermined wavelengths of electromagnetic radiation.

Figure 4G:
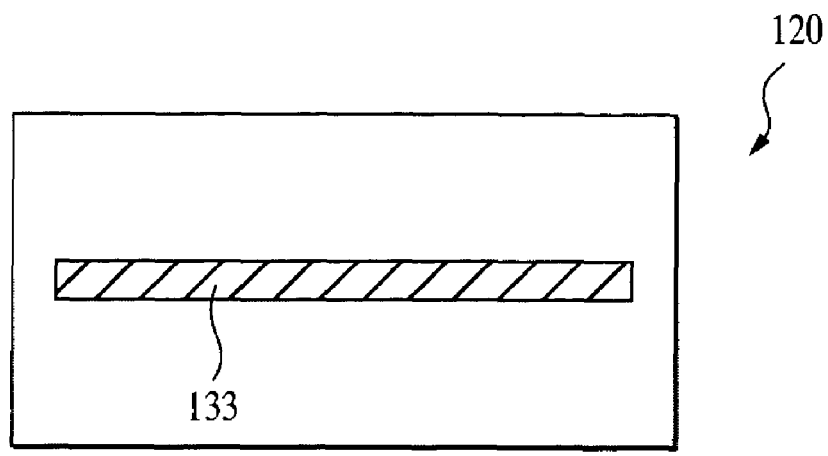

Also, as shown in FIG. 4G, there can be one or more defects 133 within the photonic crystal structure of the layer 120. A defect 133 is an interruption of the regularity of the photonic crystal structure. The defect 133 can be introduced as desired to alter the properties of the layer 120, and therefore, the interconnect 110. Further, when layer 120 includes multiple regions having differing photonic crystal structures, any one or more of the regions can contain one or more defects in their respective photonic crystal structures.

Each thickness d, spacing x, x/d ratio, horizontal cross-sectional shape of the pillars 122, dimensions of the pillars 122, orientation of the pillars 122, material of the pillars 122, material of the layer 123, regions of differing photonic crystal structures, and any purposeful defects 133 in the photonic crystal structure are design variables. These design variables can be chosen to achieve a desired configuration for layer 120 and, therefore, the desired properties of the interconnect 110. For example, the photonic crystal structure of layer 120 can be configured to have an optical band gap so that predetermined wavelengths of electromagnetic radiation are not transmitted along the interconnect 110. Also, layer 120 is configured such that the optical response correlation length is much larger than the beam diameter when soliton transmission is desired.

Figure 5:
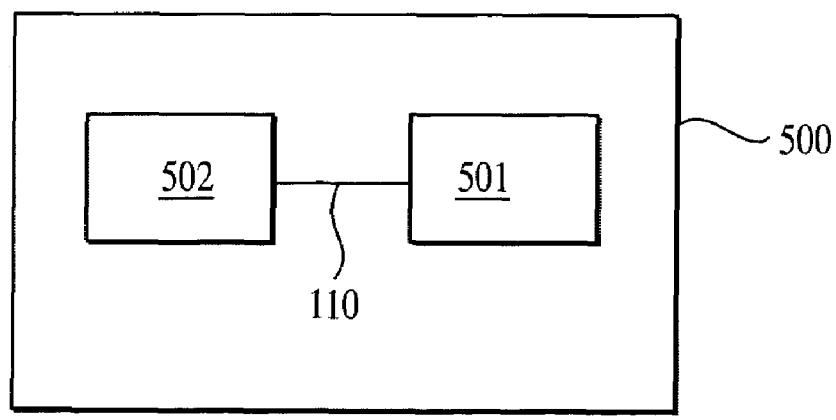
FIG. 5 is a block diagram of a circuit board including the optical element of FIG. 1.

FIG. 5 depicts another exemplary embodiment of the invention. In the FIG. 5 embodiment, the interconnect 110 is an off-chip interconnect connecting a first chip 501 with a second chip 502. The interconnect 110 and chips 501, 502 are located on a circuit board 500. To achieve the embodiment shown in FIG. 5, the interconnect 110 can be fabricated in a separate process from chips 501, 501 and board 500. Once the interconnect 110 is fabricated, it is transferred to the board 500.

Figure 6A:
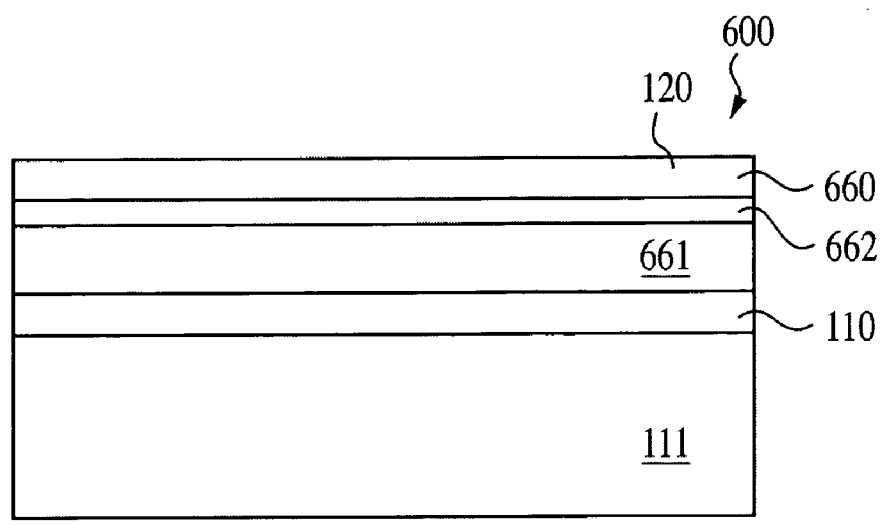
FIG. 6A is a cross-sectional view of optical elements according to an exemplary embodiment of the invention.
Figure 6B:
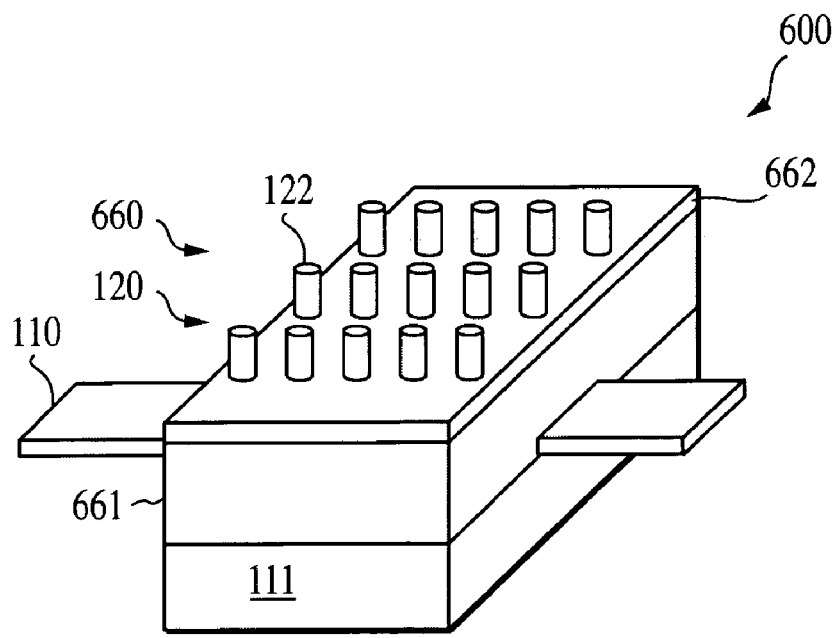
FIG. 6B is a three dimensional view of the optical elements of FIG. 6A.

FIGS. 6A and 6B depict a portion of an integrated circuit 600 having an optical interconnect 110, and a photonic crystal element 660 according to another exemplary embodiment of the invention. FIG. 6A is a cross-sectional view of a portion of the integrated circuit 600 and FIG. 6B is a three dimensional view of a portion of the integrated circuit 600.

The element 660 can be configured as a lens to focus electromagnetic radiation onto the interconnect 110 or as a filter to pass one or more wavelengths of electromagnetic radiation onto the interconnect 110. It is known that lenses and filters can be used in association with an optical interconnect. For example, a lens can be used to focus electromagnetic radiation onto the optical interconnect. Also, a filter can be used to pass a predetermined wavelength of electromagnetic radiation into an optical interconnect. A photonic crystal lens or filter 660 according to the invention is used in association with the optical interconnect 110 in place of a conventional lens or filter, respectively.

The photonic crystal element 660 is formed as a layer 120 as described above in connection with FIGS. 3A-4G. Accordingly, the element 660 has a photonic crystal structure including pillars 122. The element 660 is formed on a base layer 662. The base layer 662 is a dielectric layer, and preferably, is an oxide layer. The element 660 can be further separated from the interconnect 110 by a dielectric layer 661, such as, for example a layer of BPSG. In the embodiment shown in FIGS. 6A and 6B, the photonic crystal element 660 is formed over the interconnect 110. It should be understood, however, that the photonic crystal element 660 can be oriented in any desired manner relative to the interconnect 110 to achieve the desired focusing or filtering effect.

The design variables (e.g., the thickness d, spacing x, x/d ratio, horizontal cross-sectional shape of the pillars 122, dimensions of the pillars 122, orientation of the pillars 122, material of the pillars 122, material of the layer 123, regions of differing photonic crystal structures, and any desired defects 133 in the photonic crystal structure) can be chosen such that element 660 has desired properties. For example, when the element 660 is to serve as a lens, the design variables are chosen such that the element has a photonic crystal structure configured to focus electromagnetic radiation onto the interconnect 110. When the element 660 is to serve as a filter, the design variables are chosen such that the element has a photonic crystal structure configured to select one or more wavelengths of electromagnetic radiation to pass to interconnect 110 and prohibit other wavelengths from reaching the interconnect 110.

Figure 7:
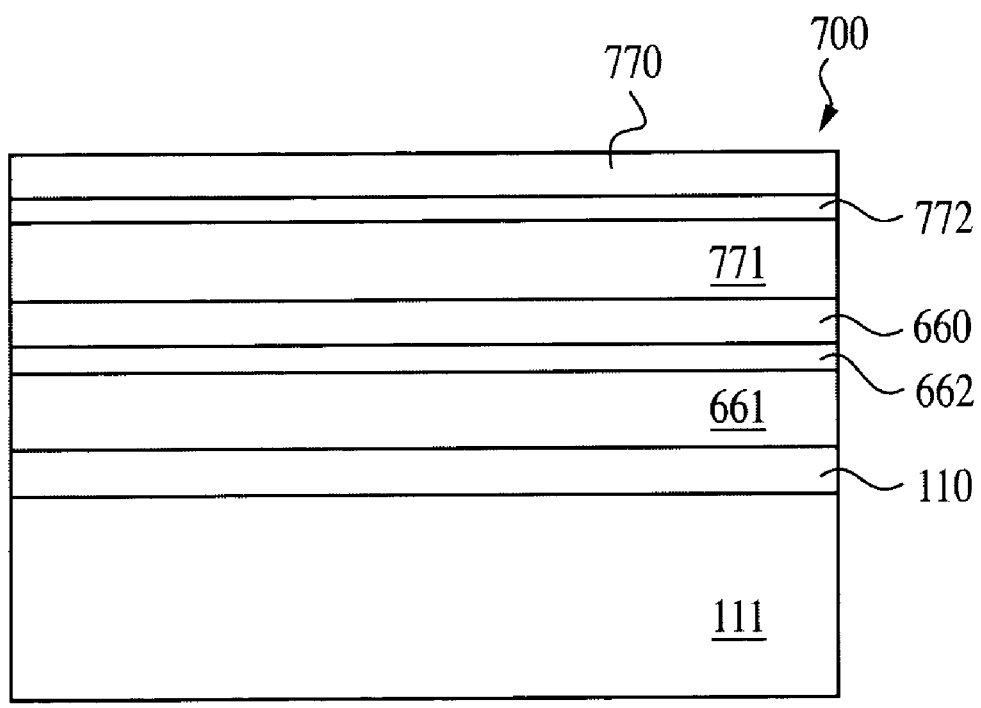
FIG. 7 is a cross-sectional view of optical elements according to an exemplary embodiment of the invention.

FIG. 7 depicts an integrated circuit 700 having two photonic crystal elements 660, 770 and an interconnect 110 according to another exemplary embodiment of the invention. In the embodiment of FIG. 7, one of the elements 660, 770 is a photonic crystal lens and the other element 660, 770 is a photonic crystal filter. Illustratively, element 660 is a filter and has a photonic crystal structure configured to select one or more wavelengths of electromagnetic radiation to pass to interconnect 110 while prohibiting other wavelengths from reaching the interconnect 110. Element 770 is a photonic crystal lens and has a photonic crystal structure configured to focus electromagnetic radiation onto the interconnect 110. The elements 660, 770 can be formed as described above in connection with FIG. 6 if desired. The element 770 is formed on a base layer 772 The base layer 772 is a dielectric layer, and preferably, is an oxide layer. The element 770 can be further separated from the element 660 by a dielectric layer 661, such as, for example a layer of BPSG if desired.

Although FIG. 7 depicts a photonic crystal filter 660 underlying a photonic crystal lens 770, it should be understood that any suitable configuration can be used. That is, filter 600 and lens 700 can replace or compliment conventional lenses in any desired or conventional optical interconnect circuit. Further, although the photonic crystal filter 660 and lens 770 are shown in connection with photonic crystal interconnect 110 in the embodiments of FIGS. 6 and 7, the photonic crystal filter 660 and lens 770 can be used in connection with a conventional optical interconnect (not shown). Also, a conventional lens and/or filter (not shown) can be used in connection with the photonic crystal interconnect 110.

Figure 8:
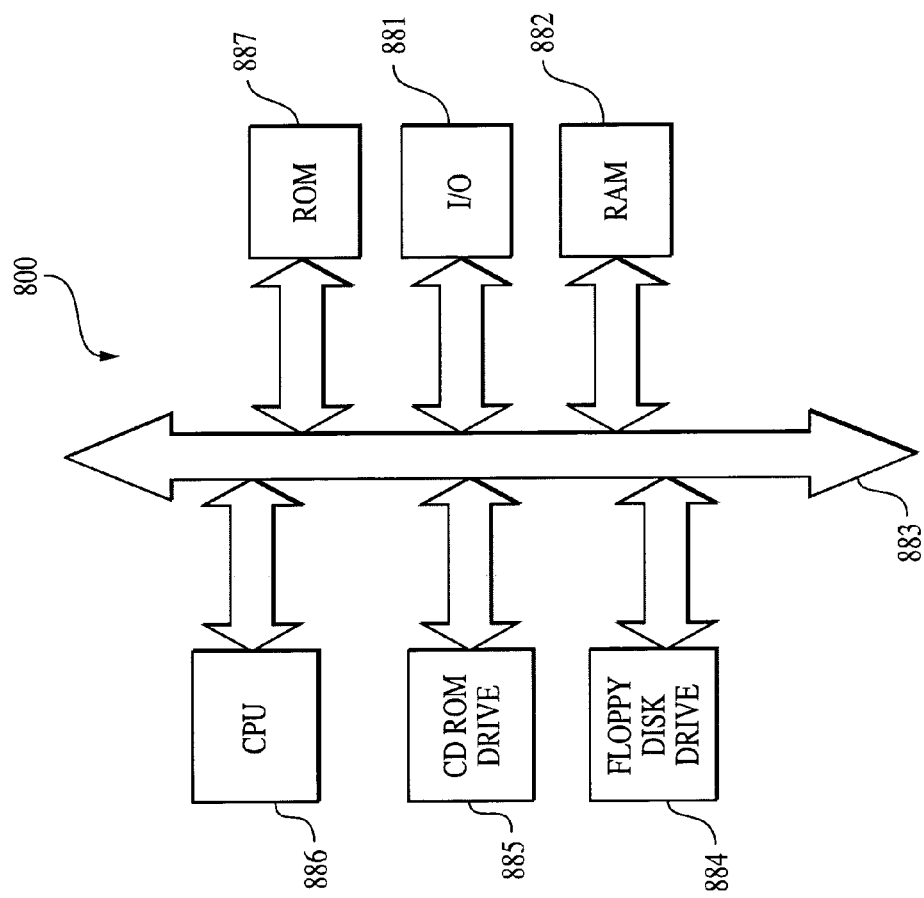
FIG. 8 is a block diagram of a processor system according to an exemplary embodiment of the invention.

FIG. 8 illustrates a block diagram of a processor system 800. The processor system 800 may be a computer system or any other processor system. The system 800 includes a central processing unit (CPU) 886, e.g., a microprocessor, that communicates with a floppy disk drive 884, CD ROM drive 885, and random access memory (RAM) 882 over a bus 883. It must be noted that the bus 883 may be a series of buses and bridges commonly used in a processor-based system, but for convenience purposes only, the bus 883 has been illustrated as a single bus. An input/output (I/O) device (e.g., monitor) 881 may also be connected to the bus 883, but is not required in order to practice the invention. The processor-based system 800 also includes a read-only memory (ROM) 887 which may also be used to store a software program. One or more of the devices 881-887 of the system 800 include a photonic crystal-based optical element 110, 660, 770 according to the invention.

It is again noted that the above description and drawings are exemplary and illustrate preferred embodiments that achieve the objects, features and advantages of the present invention. It is not intended that the present invention be limited to the illustrated embodiments. Any modification of the present invention which comes within the spirit and scope of the following claims should be considered part of the present invention.

The invention claimed is:

1. An optical device comprising:
    a substrate; and
    a photonic crystal optical interconnect comprising:
        a first cladding layer over the substrate;
        a photonic crystal layer over the first cladding layer, the photonic crystal layer comprising at least one photonic crystal element comprising a plurality of pillars being spaced apart from each other; and
        a second cladding layer over the photonic crystal layer, wherein the pillars do not extend into the second cladding layer,
        wherein the photonic crystal element comprises a first region having a first photonic crystal structure, a second region having a second different photonic crystal structure, and a third region having a third photonic crystal structure different from that of the first region and the second region, wherein the difference in photonic crystal structure among the three regions is based on a difference in pillar characteristics including at least a difference in pillar shape or size, said photonic crystal element forming a wavelength filter for the interconnect.

2. The optical device of claim 1, wherein the photonic crystal optical interconnect is configured for transmitting electromagnetic radiation.

3. The optical device of claim 2, wherein the photonic crystal optical interconnect has a photonic crystal structure configured such that optical response correlation length is larger than a diameter of an electromagnetic radiation beam incident on the photonic crystal optical interconnect.

4. The optical device of claim 3, wherein the optical interconnect has a photonic crystal structure configured to permit the transmission of a soliton.

5. The optical device of claim 1, further comprising a second photonic crystal element which is a photonic crystal lens associated with the optical interconnect and is configured to focus electromagnetic radiation onto the optical interconnect.

6. The optical device of claim 5, where the photonic crystal lens is a flat lens.

7. The optical device of claim 5, where the photonic crystal lens is configured to have a negative index of refraction.

8. The optical device of claim 1, further comprising a second photonic crystal element which is a photonic crystal filter associated with the optical interconnect and is configured to pass predetermined electromagnetic wavelengths to reach the optical interconnect.

9. The optical device of claim 1, wherein the photonic crystal element further comprises a material within the spacing between the pillars, the material having a dielectric constant that is lower than a dielectric constant of the pillars.

10. The optical device of claim 1, wherein the pillars comprise aluminum oxide.

11. The optical device of claim 1, wherein the photonic crystal element further comprises a third region having a third photonic crystal structure different from the photonic crystal structure of the first and second regions.

12. An integrated circuit comprising:
a substrate;
a first circuit on the substrate;
a second circuit on the substrate; and
a photonic crystal optical interconnect comprising:
a first cladding layer over the substrate;
a photonic crystal layer over the first cladding layer, the photonic crystal layer comprising at least one photonic crystal element for affecting the transmission of electromagnetic radiation from the first circuit to the second circuit, the photonic crystal element comprising a plurality of pillars being spaced apart from each other; and
a second cladding layer over the photonic crystal layer, wherein the pillars do not extend into the second cladding layer,
wherein the photonic crystal element comprises a first region having a first photonic crystal structure, a second region having a second different photonic crystal structure, and a third region having a third photonic crystal structure different from that of the first region and the second region, wherein the difference in photonic crystal structure among the three regions is based on a difference in pillar characteristics including at least a difference in pillar shape or size, said photonic crystal element forming a wavelength filter for the interconnect.

13. The integrated circuit of claim 12, wherein the photonic crystal element further comprises a material within the spacing between the pillars, the material having a dielectric constant that is lower than a dielectric constant of the pillars.

14. The integrated circuit of claim 12, wherein the pillars comprise aluminum oxide.

15. The integrated circuit of claim 12, further comprising a second photonic crystal element which is a photonic crystal lens.

16. The integrated circuit of claim 12, further comprising a second photonic crystal element which is a photonic crystal filter.

17. The integrated circuit of claim 12, wherein the photonic crystal element further comprises a third region having a third photonic crystal structure different from the photonic crystal structure of the first and second regions.

18. A processor-based system comprising:
a processor; and
a circuit coupled to the processor, the circuit comprising:
a substrate; and
a photonic crystal optical interconnect comprising:
a first cladding layer over the substrate;
a photonic crystal layer over the first cladding layer, the photonic crystal layer comprising at least one photonic crystal element comprising a plurality of pillars being spaced apart from each other; and
a second cladding layer over the photonic crystal layer, wherein the pillars do not extend into the second cladding layer,
wherein the photonic crystal element comprises a first region having a first photonic crystal structure, a second region having a second different photonic crystal structure, and a third region having a third photonic crystal structure different from that of the first region and the second region, wherein the difference in photonic crystal structure among the three regions is based on a difference in pillar characteristics including at least a difference in pillar shape or size, said photonic crystal element forming a wavelength filter for the interconnect.

19. The system of claim 18, wherein the photonic crystal element further comprises a third region having a third photonic crystal structure different from the photonic crystal structure of the first and second regions.

20. A photonic crystal optical element for a circuit, the optical element comprising:
a substrate; and
a photonic crystal optical interconnect comprising:
a first cladding layer over the substrate;
a photonic crystal layer over the first cladding layer, the photonic crystal layer comprising at least one photonic crystal element comprising a plurality of pillars being spaced apart from each other;
a second cladding layer over the photonic crystal layer, wherein the pillars do not extend into the second cladding layer; and
a low dielectric constant material within the spacing between the pillars having a dielectric constant that is lower than a dielectric constant of the pillars,
wherein the photonic crystal element comprises a first region having a first photonic crystal structure, a second region having a second different photonic crystal structure, and a third region having a third photonic crystal structure different from that of the first region and the second region, wherein the difference in photonic crystal structure among the three regions is based on a difference in pillar characteristics including at least a difference in pillar shape or size, said photonic crystal element forming a wavelength filter for the interconnect.

21. The photonic crystal optical element of claim 20, wherein the pillars and low dielectric constant material together have an approximately flat top surface.

22. The photonic crystal optical element of claim 20, wherein the pillars have a height within the range of approximately 100 Å to approximately 5000 Å.

23. The photonic crystal optical element of claim 20, wherein a ratio of the spacing between the pillars to a height of the pillars is within the range of approximately 1 to approximately 10.

24. The photonic crystal optical element of claim 20, wherein at least one of the photonic crystal structures has at least one defect.

25. The photonic crystal optical element of claim 20, wherein the pillars each of at least one of the regions have a circular horizontal cross-sectional shape.

26. The photonic crystal optical element of claim 20, wherein the pillars of at least one of the regions have a pentagonal horizontal cross-sectional shape.

27. The photonic crystal optical element of claim 20, wherein the pillars of at least one of the regions have a rectangular horizontal cross-sectional shape.

28. The photonic crystal optical element of claim 20, wherein the pillars comprise aluminum oxide.

29. The photonic crystal optical element of claim 20, wherein the pillars comprise zirconium oxide.

30. The photonic crystal optical element of claim 20, wherein the pillars comprise hafnium oxide.

31. The photonic crystal optical element of claim 20, wherein the pillars comprise a silver halide.

32. The photonic crystal optical element of claim 20, wherein the pillars comprise a polymer material based on high density polyethylene.

33. The photonic crystal optical element of claim 20, wherein the low dielectric constant material is spun on glass.

34. The photonic crystal optical element of claim 20, wherein the low dielectric constant material is silicon dioxide.

35. The photonic crystal optical element of claim 20, wherein the photonic crystal element is configured to transmit electromagnetic radiation.

36. The photonic crystal optical element of claim 20, wherein the photonic crystal element is configured to transmit solitons.

37. The photonic crystal optical element of claim 20, wherein the photonic crystal element is configured to focus electromagnetic radiation.

38. The photonic crystal optical element of claim 20, wherein the photonic crystal element is configured to pass predetermined wavelengths of electromagnetic radiation.

39. The optical element of claim 20, wherein the photonic crystal element further comprises a third region having a third photonic crystal structure different from the photonic crystal structure of the first and second regions.

40. A method of forming a photonic crystal element for a circuit, the method comprising:
providing a substrate;
providing a first cladding layer over the substrate;
forming a layer of a photonic crystal material over the first cladding layer;
patterning the photonic crystal material layer to form a plurality of pillars, wherein pillars in a first region have a first photonic crystal structure, pillars in a second region have a second different photonic crystal structure, and pillars in a third region have a third photonic crystal structure different from that of the pillars in the first region and the second region, wherein the difference in photonic crystal structure is based on a difference in pillar characteristics including at least a difference in pillar size or shape, said photonic crystal element forming a wavelength filter;
placing a low dielectric constant material having a lower dielectric constant than a dielectric constant of the pillars within the spacing between the pillars; and
providing a second cladding layer over the photonic crystal material and the low dielectric constant material, wherein the pillars do not extend into the second cladding layer.

41. The method of claim 40, wherein the act of forming a layer of a photonic crystal material comprises forming the photonic crystal material layer having a thickness within a range of approximately 100 Å to approximately 5000 Å.

42. The method of claim 40, wherein the act of patterning the photonic crystal material layer comprises forming at least one defect in the photonic crystal structure.

43. The method of claim 40, wherein the act of patterning the photonic crystal material layer comprises forming the pillars such that a ratio of the spacing between the pillars to the height of the pillars is within the range of approximately 1 to approximately 10.

44. The method of claim 40, wherein the act of patterning the photonic crystal material layer comprises forming the pillars of at least one of the regions with a circular horizontal cross-sectional shape.

45. The method of claim 40, wherein the act of patterning the photonic crystal material layer comprises forming the pillars of at least one of the regions with a rectangular horizontal cross-sectional shape.

46. The method of claim 40, wherein the act of patterning the photonic crystal material layer comprises forming the pillars of at least one of the regions with a pentagonal horizontal cross-sectional shape.

47. The method of claim 40, wherein the act of forming the layer of a photonic crystal material comprises forming a layer of aluminum oxide.

48. The method of claim 40, wherein the act of forming the layer of a photonic crystal material comprises forming a layer of polymer material based on high density polyethylene.

49. The method of claim 40, wherein the act of forming the layer of a photonic crystal material comprises forming a layer of zirconium oxide.

50. The method of claim 40, wherein the act of forming the layer of a photonic crystal material comprises forming a layer of hafnium oxide.

51. The method of claim 40, wherein the act of forming the layer of a photonic crystal material comprises forming a layer of a silver halide.

52. The method of claim 40, wherein the act of placing the low dielectric constant material comprises depositing spun on glass.

53. The method of claim 40, wherein the act of placing the low dielectric constant material comprises depositing silicon dioxide.

54. The method of claim 40, wherein the act of patterning the photonic crystal material layer comprises forming the photonic crystal structure to transmit electromagnetic radiation.

55. The method of claim 40, wherein the act of patterning the photonic crystal material layer comprises forming the photonic crystal structure to transmit solitons.

56. The method of claim 40, wherein the photonic crystal structures are formed to focus electromagnetic radiation.

57. The method of claim 40, wherein the photonic crystal structures are formed to pass predetermined wavelengths of electromagnetic radiation.

58. The method of claim 40, wherein the patterning of the photonic crystal material layer further comprises forming pillars in a third region having a third photonic crystal structure different from the photonic crystal structures of the first and second regions.

* * * * *

UNITED STATES PATENT AND TRADEMARK OFFICE
CERTIFICATE OF CORRECTION

PATENT NO. : 7,418,161 B2  Page 1 of 1
APPLICATION NO. : 10/872499
DATED : August 26, 2008
INVENTOR(S) : Chandra Mouli It is certified that error appears in the above-identified patent and that said Letters Patent is hereby corrected as shown below:

In column 10, line 54, in Claim 25, after "pillars" delete "each".

Signed and Sealed this

Eighteenth Day of November, 2008

JON W. DUDAS
*Director of the United States Patent and Trademark Office*